UNITED STATES PATENT OFFICE.

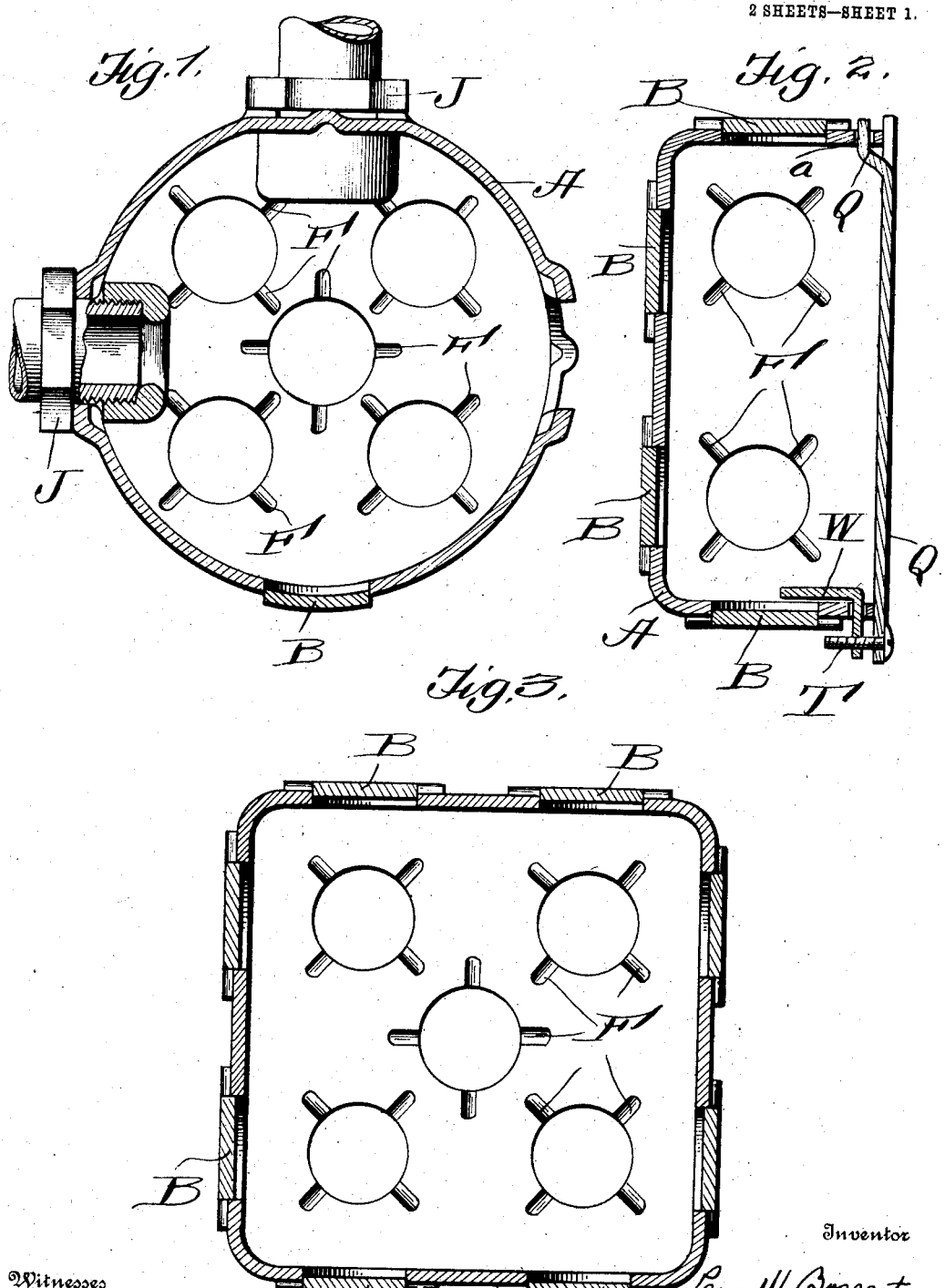

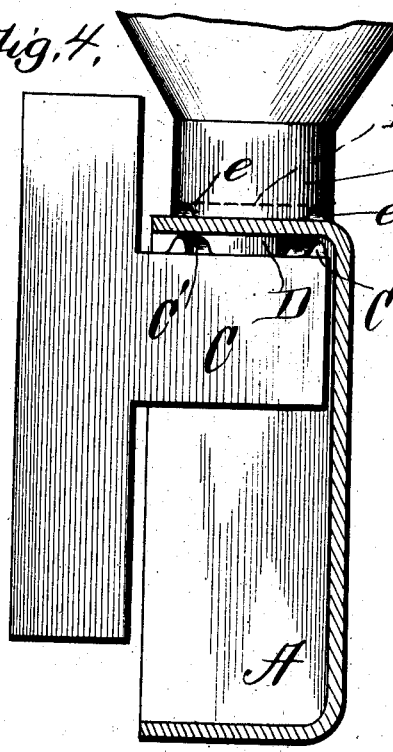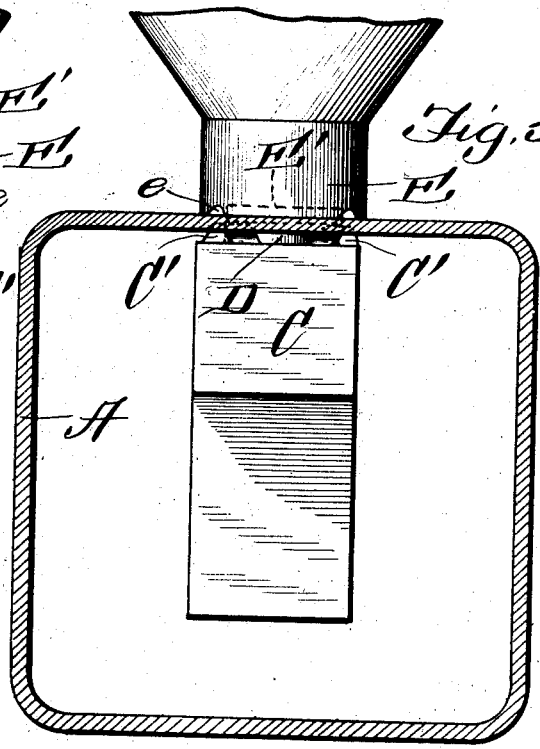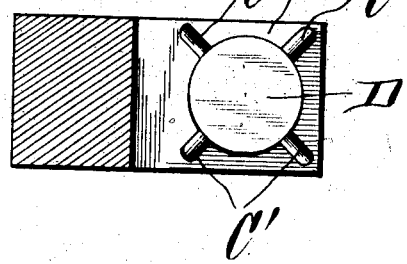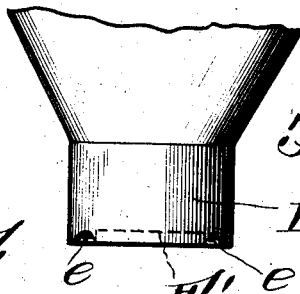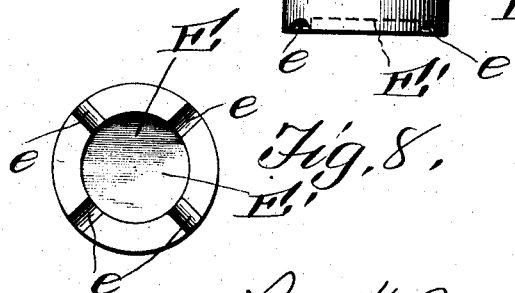

LEON W. BOSSERT, OF UTICA, NEW YORK.

JUNCTION OR OUTLET BOX.

No. 854,195.

Specification of Letters Patent.

Patented May 21, 1907.

Application filed February 10, 1906. Serial No. 300,509.

*To all whom it may concern:*

Be it known that I, LEON W. BOSSERT, a citizen of the United States, residing at Utica, in the county of Oneida and State of New York, have invented certain new and useful Improvements in Junction or Outlet Boxes; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in junction or outlet boxes in which the walls of the box or bottom are provided with weakened portions which may be removed therefrom to permit electric conductors to be carried into the interior of the boxes and proper connections made at the desired point or points.

The object of the present invention is to provide a box having plugs which are entirely severed from the walls of the box which plugs are cut from the metal of the box and pressed toward the outside surface thereof instead of toward the inside, as has been common in the art, and by the driving of the plugs in accordance with the present invention, means is afforded whereby the plaster of a wall may securely adhere to and hold a box in place.

For commercial purposes it is desirable to furnish to the trade boxes having removable plugs or weakened portions cut from the walls and bottoms thereof, which, when removed, form means for the entrance of conduits and conductors, and at the same time affording means for closing all openings not used for conduits in the box, when placed in a wall. For electrical purposes, it is required that there should be good connections between the boxes and conduit, and the ground, and to this end I provide means comprising struck up portions adjacent to the periphery of the plug closed openings against which the tightening nuts upon a conduit may be screwed, forming a secure contact surface.

In drawing up a flat piece of steel in the shape of a box, the texture or fiber of the upper surface of such piece of metal, which in all cases forms the inside of the box, is not stretched or strained, but is contracted, while the under or outside surface of the box is strained more or less by the tremendous friction between the outside wall of the box and the drawing die in passing through the same, and such surface thereby becomes hard and brittle; therefore, if the plug is cut from the inside wall of the box and partially driven to the outside, the soft and contracted fiber of the steel may be cut clear, thereby having no uneven surface around the opening in the box. The operation of driving a plug outwardly may be utilized so as to form a flat surface on the inside and outside of the box at the same movement of punch press, which is an advantage in the case of a round box, as a better contact between the conduit and box may be had.

My invention comprises other details of construction and arrangements of parts which will be hereinafter fully described and then specifically defined in the appended claims.

I illustrate my invention in the accompanying drawings, in which:—

Figure 1 is a sectional view through an outlet box made in accordance with my invention. Fig. 2 is a sectional view through the box. Fig. 3 is a sectional view through a square-outlined box. Fig. 4 is a sectional view through a box, anvil and punching die. Fig. 5 is a similar view showing a plug which has been severed from the wall of the box and ridges struck up about the marginal edge thereof. Fig. 6 is a sectional view showing the end of the die. Fig. 7 is a side elevation of the punch, and Fig. 8 is an end view of the punch.

Reference now being had to the details of the drawings by letter, A designates a circular-outlined outlet box which is formed from a piece of ductile sheet metal by means of dies in the usual manner of pressing up articles of this character, and B, B designate plugs which are loosened from the walls or bottom of the box, being driven, by means of punches and dies, toward the outside surface of the box and projecting therefrom, forming means whereby the box may be securely anchored by a plastering within a partition. Referring to Fig. 4 of the drawings, will be seen an anvil C having a die D upon the upper edge of the projecting portion thereof and adapted to co-operate with the punch E which has a recess E' in the bottom thereof, preferably of a less depth than the thickness of the wall of the box, and at locations about the marginal edge of said recess are the indentures or grooves e which are adapted to co-operate with lugs C' positioned about the marginal edge of the die, and adapted to conform with said indentures or grooves to form ribs or ridges F radially about the marginal edges of the plug filled openings in the bottom or side wall of the box, said ridges being clearly shown in Figs. 1 to 3 inclusive, of the drawings.

In Fig. 4 of the drawings, I have shown the die and punch in the positions they assume when about to act upon the wall of the box, and in Fig. 5 of the drawings, the punch is shown as having been driven against the wall of the box and a plug severed from the wall and the ridges F formed in the outer surface of the box and projecting about the marginal edges of the plug filled apertures. The recess E' in the end of the punch is preferably less in depth than the thickness of the metal, whereby as the punch is forced against the metal, a disk or plug cut from the wall of the box, will be spread and forced to expand laterally, so that the severed portions thereof will be caused to firmly engage the surrounding wall of the partially formed aperture and will not be forced entirely through the wall thereof. By the provision of the ridges about the marginal edges of the apertures from which the plugs are cut, means is afforded for making good connections between the lock nuts J (Fig. 1 which illustrates a conduit connected with the box), and the latter.

Should it be desired to have flat surfaces on the inside and outside of the round box for fastening bushings and lock nuts, suitable dies and punches may be furnished for that purpose, whereby such surfaces may be formed at one operation and without extra cost.

In common practice, outlet boxes of the nature of the foregoing are coated with a heavy insulating enamel baked upon the same to prevent rusting. In order to make good ground connection between the conductor and the box, the enamel upon the boxes now commonly in use has to be scraped off around the outlet where the conduit is inserted, or a piece of copper wire fastened to the conduit and box. These proceedings require time and are therefore expensive and are rendered unnecessary by the present invention, as it will be readily understood that the insulating enamel is automatically removed from the ridges about the marginal outlines of the apertures by the tightening of the lock nuts to the box.

A suitable cover Q is provided having a lip Q' designed to engage a slot a formed in the wall of the box, and a screw T is passed through an aperture in the projecting portion of the cover and is adapted to engage a threaded aperture in an angled clip W which passes through an aperture in the box.

From the foregoing, it will be noted that by the formation of an outlet box in which the disks or plugs are driven outwardly instead of inwardly, as has been the common practice, the texture or the fiber of the upper surface which forms the inside of the box is not stretched or strained, but is contracted, while the outer surface is necessarily strained more or less by the friction between the outside wall of the box and the drawing die, and thereby becomes hard and brittle, and when the plug is cut from the inside wall of the box and partially driven to the outside, a soft and contracted fiber of steel may be cut clear, thereby leaving no uneven surface around the opening in the box, whereas by the punching of the blank plugs toward the inside, it has been found that the edges of the apertures are frequently so roughened that they will cause damage to conduits passing through the same, unless the roughed edges at the point of severance of the integral portions of the plugs, have been first ground down and which necessitates additional time and labor.

What I claim is:—

1. An outlet box having one or more blanks or plugs partially severed from the wall thereof and projecting beyond the side wall of the box, ridges struck up from the box and extending through the marginal apertures of said blanks and frictionally engaging the same, as set forth.

2. An outlet box having one or more blanks or plugs partially severed from the wall of the box and projecting beyond the outer surface of the box, and ridges projecting from the outer surface of the box about the marginal edges of said blanks or plugs, as shown and described.

In testimony whereof I hereunto affix my signature in the presence of two witnesses.

LEON W. BOSSERT.

Witnesses:
DAYTON ROTH,
CLARENCE C. BOFF.